UNITED STATES PATENT OFFICE.

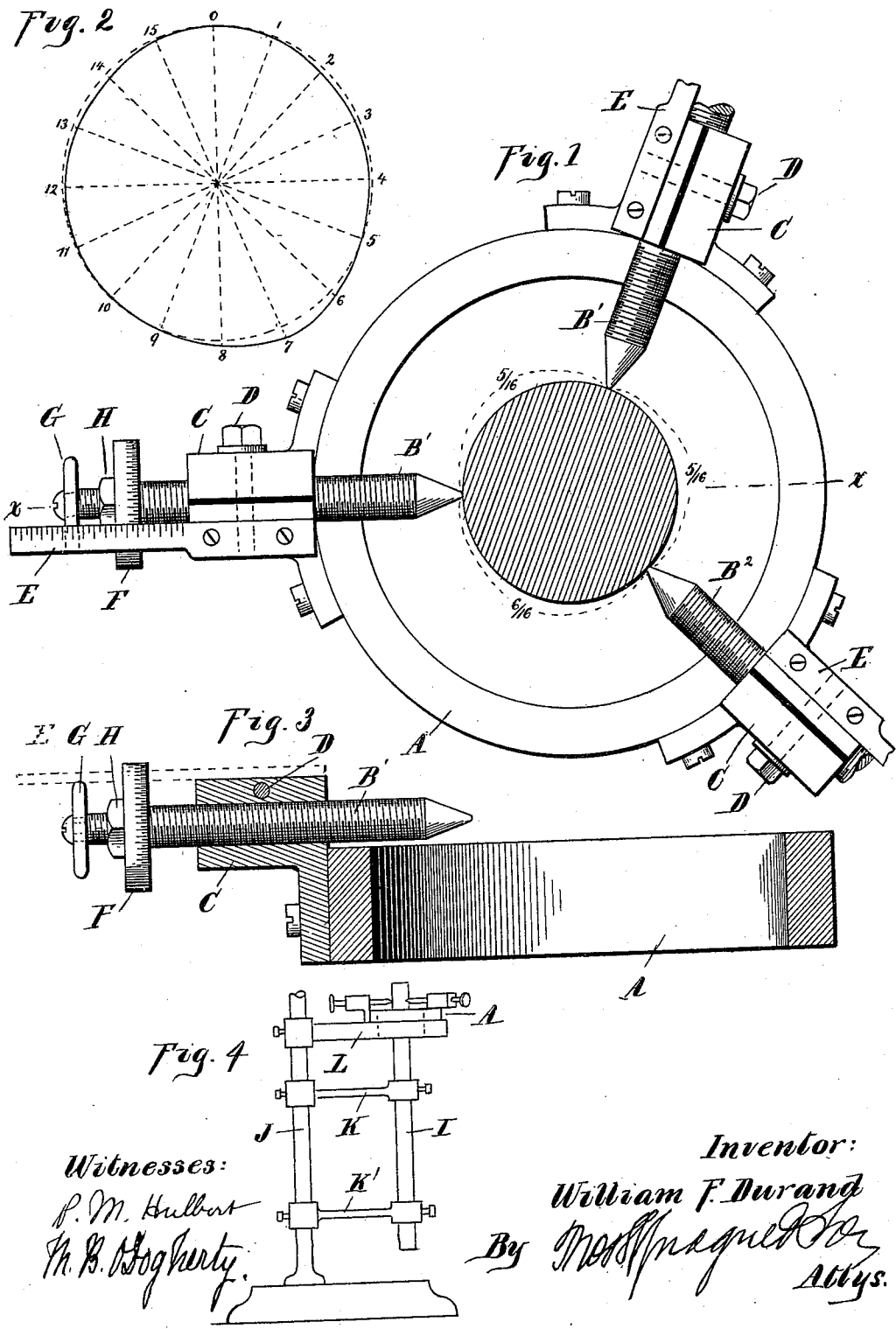

WILLIAM F. DURAND, OF LANSING, MICHIGAN.

CALIPERS.

SPECIFICATION forming part of Letters Patent No. 470,912, dated March 15, 1892.

Application filed April 24, 1891. Serial No. 390,343. (No model.)

*To all whom it may concern:*

Be it known that I, WILLIAM F. DURAND, a citizen of the United States, residing at Lansing, in the county of Ingham and State of Michigan, have invented certain new and useful Improvement in Calipers, of which the following is a specification, reference being had therein to the accompanying drawings.

This invention relates to new and useful improvements in calipers especially designed for calipering circular bodies.

In the construction of scientific instruments of precision it is of great importance to prevent all errors arising from the imperfect roundness of journal-bearings and other parts which are to be absolutely round for the precise mathematical operation, and it is well known that even with the best mechanical appliances employed in the construction of instruments of precision such defects will always occur, and in order to detect and eliminate the same I have constructed the instrument hereinafter more fully described, and shown in the drawings, of which—

Figure 1 gives a plan view of the instrument, illustrating its manner of operation in connection with Fig. 2, which represents the manner of graphically applying the measurements of the instrument. Fig. 3 represents a cross-section on line $x$ $x$ in Fig. 1, and Fig. 4 represents in diagram a suitable holder to be used in connection with the instrument for calipering shafts or shaft-bearings.

My improved calipers consists of a frame or base A, which is preferably centrally apertured, and for the sake of convenience in manufacture may best be made in the form of a rigid ring. Upon this ring radially mounted are three gages B B' B², which are radially adjustable from and toward a common center. For very accurate work I make these gages in the form of a micrometer-screw, the inner end of which is pointed to form contact-points, and which are radially adjustable in screw-threaded bearings C C C, rigidly secured to the frame. These bearings are preferably split and provided with clamp-screws D, by means of which the micrometer-screws may be tightly clamped to take up any lost motion. These micrometer-screws are provided with suitable scales E, by means of which the distance of the contact-point of each micrometer-screw from the common center is accurately indicated. To make these measurements very accurate, I provide the scale with units of division corresponding with the pitch of the screw, and each screw is provided with a round head F, the periphery of which travels in close proximity with the scale, whereby the inner edge of this head forms an accurate index for reading the scale. The periphery of the heads F is also provided with a scale which, in connection with the scale E, may indicate fractional divisions of the unit. Thus, for instance, if the pitch of the screw is one millimeter the division of the scale would be in millimeters and the periphery of the head of the screw would be divided, say, for instance, in one-hundredth parts, so as to give the reading accurate to the one-hundredth part of a millimeter.

To adjust the screw in or out I preferably provide the scale with a suitable knob G, by means of which it may be readily turned. For the sake of accurate adjustment I preferably secure the head F adjustably upon the screw and secure it in its adjusted position by a jam-nut H.

The three screws, as before described, have a common center, which in the construction shown in the drawings is also the center of the frame A, and the axis of the three screws form three radii, which lie in a common plane and divide the circle into three angles, which bear a definite relation to each other—to wit., two of the angles are alike and the third is a fraction larger or smaller.

In the drawings the angle of the screws B B' and B' B² is five-sixteenths of the whole circle, while the angle between the screws B B² is six-sixteenths. For greater accuracy the relation of the angles may be such that they are multiples of still smaller subdivisions of the circle, or if lesser accuracy is required the three angles may be multiples of larger subdivisions of the circle—as, for instance, two of the angles may be each three-tenths of the whole circle and the third angle four-tenths, thus making one angle one division larger than the other two. The object of this peculiar relation I will now proceed to explain in giving the description of the manner of using the instrument in connection with calipering a bearing formed on the tubular shaft I. (Shown in Fig. 4.) To this end a suitable holder is provided, which may consist of a standard J, having two vertically-adjustable arms K K', the outer ends of which have suitable means for holding the shaft I in vertical position. The standard J is also provided with an arm L, adjustably secured thereto and adapted to form a support for the instrument, the whole being adjusted as shown in Fig. 4, in which the bearing on the tubular body I projects upward through an aperture in the arm L, with the instrument placed upon the arm L in the proper position for admitting the bearing between the contact-points of the gage-screws. In proceeding now to caliper I first adjust the screws so that they touch the bearing at three points, and at the same time give the same reading at all three scales. Suppose these three points are the points 0 5 10, (marked in Fig. 1,) the reading given by the scales will then be the radii of a true circle, defined by the points 0 5 10 on the bearing. With this radius given by the screws I then draw a circle, as shown in Fig. 2, and divide its periphery into as many parts as indicated by the number of which the angles of the screws are multiples. Now I mark on the bearing the three points 0 5 10 with a steel point or in any other suitable manner and adjust my instrument to a new position in which the screw B touches the point 5 and the screw B' touches the point 10. On account of the particular spacing of the screws the screw $B^2$ will now coincide with the point 15, provided that point is in the true circle with the points 0 5 10. If not, I adjust the screw so that it will touch the bearing, and by means of the scale I find out the radius of this point and mark it on my graphical representation, and also mark the point on the bearing. Now I adjust my instrument into another new position, using the new point 15, the value of which is now known in connection with the screw B', for instance, which screw of course I adjust to the value of the point 15. The point 10, which is already found, will then be brought in contact with the screw B, which of course must be adjusted to the value of the point 10, and the point 4 will then come in position for calipering by the screw $B^2$, which screw I now adjust to touch the bearing, and thus find the value of the new point 4. Proceeding in this manner—that is, using always two of the points whose value is found to ascertain the value of a new third point—I can determine the value of sixteen points at equal distances around the bearing and make a graphical representation of a cross-section of the bearing as found by the calipers. As these points are also marked on the bearing the mechanic can now intelligently proceed, in connection with the graphical representation, to tool or round off the bearing at the point where it does not conform to a true circle.

It is obvious from this description that the number of points the value of which may thus be ascertained by the use of the instrument in the manner described depends upon the peculiar angles into which the screws divide the circle.

Anybody familiar with using instruments of precision will readily succeed with my instrument and apply it to various purposes to which its scope is adapted, such as finding the diameter or radius of round bodies and examining various parts of machinery, such as wheels, &c., as to their accuracy of construction.

To those who have investigated the subject, it is well known that with ordinary calipers a body which is not mathematically round at all may pass the test of such calipers, and therefore my instrument, which avoids any possible error, affords the only true way of calipering round bodies.

Of course it will be understood that the graphical representation is not an absolute feature of the use of my calipers, as the results may be utilized in other ways.

The frame A need not be necessarily circular, nor be provided with a central aperture, the latter being unnecessary where only disks or wheels have to be examined.

While the description I have given above of the use of my instrument may not be strictly applicable to meet all the contingencies within the scope of my invention, it will enable the operator to understand the principle of the instrument, and he can modify the manner of using it according to circumstances or the object in view.

What I claim as my invention is—

1. In calipers, the combination of a support and three gages mounted thereon radially adjustable to and from a common center, two angles between said gages being equal and the third angle varying from said two angles at a certain definite ratio, substantially as described.

2. In calipers, the combination, with the supporting-frame, of three gages mounted thereon adjustable from and toward a common center, three radial lines dividing the circle into three angles, two of which are like multiples of a small sector of a whole circle and the third angle one such sector larger or smaller, substantially as described.

In testimony whereof I affix my signature in presence of two witnesses.

WILLIAM F. DURAND.

Witnesses:
W. H. VAN DEWOORT,
W. A. HAMILTON.